(12) United States Patent
Hutchinson et al.

(10) Patent No.: US 10,943,340 B2
(45) Date of Patent: Mar. 9, 2021

(54) BLENDING IMAGES

(71) Applicant: Avago Technologies International Sales Pte. Limited, Singapore (SG)

(72) Inventors: James Hutchinson, Cambridge (GB); Thomas Oscar Miller, Cambridge (GB); Stephen John Barlow, Cambridge (GB); Jack Stuart Haughton, Cambridge (GB)

(73) Assignee: Avago Technologies International Sales Pte. Limited, Singapore (SG)

( * ) Notice: Subject to any disclaimer, the term of this patent is extended or adjusted under 35 U.S.C. 154(b) by 249 days.

(21) Appl. No.: 16/094,454

(22) PCT Filed: Apr. 18, 2017

(86) PCT No.: PCT/GB2017/051070
§ 371 (c)(1),
(2) Date: Aug. 23, 2019

(87) PCT Pub. No.: WO2017/182789
PCT Pub. Date: Oct. 26, 2017

(65) Prior Publication Data
US 2019/0370949 A1 Dec. 5, 2019

(30) Foreign Application Priority Data

Apr. 18, 2016 (GB) .................................... 1606746

(51) Int. Cl.
*G06T 5/50* (2006.01)
*G06T 3/40* (2006.01)

(52) U.S. Cl.
CPC .............. *G06T 5/50* (2013.01); *G06T 3/4007* (2013.01); *G06T 2207/20221* (2013.01)

(58) Field of Classification Search
CPC ......... G06T 2207/20221; G06T 3/4007; G06T 3/4038; G06T 5/50
See application file for complete search history.

(56) References Cited

U.S. PATENT DOCUMENTS 6,704,440 B1 3/2004 Kump
9,589,350 B1 3/2017 Kuzko
(Continued)

FOREIGN PATENT DOCUMENTS

EP 0548917 6/1993
EP 0877338 11/1998
EP 2355532 8/2011

OTHER PUBLICATIONS

Burt et al., "A Multiresolution Spline With Application to Image Mosaics," ACM Transactions on Graphics, Oct. 1, 1983, 2(4):217-236.
(Continued)

*Primary Examiner* — Manuchehr Rahmjoo
(74) *Attorney, Agent, or Firm* — Morgan, Lewis & Bockius LLP

(57) ABSTRACT

An apparatus for combining multiple images to form a blended image, configured to identify regions of overlap: (i) in a first image and in a second image, corresponding to where those first and second images will overlap each other in the blended image; and (ii) in the first image and in a third image, corresponding to where those first and third images will overlap each other in the blended image, identify an image quality associated with each region of overlap, determine a gain for each image that, when applied to the image as a whole, will minimise a sum of: (i) a difference between the image qualities associated with the regions of overlap in the first and second images; and (ii) a difference between the image qualities associated with the regions of overlap in the (Continued)

first and third images and apply the respective gains to the first, second and third images.

9 Claims, 9 Drawing Sheets

(56) References Cited

U.S. PATENT DOCUMENTS

| | | |
|---|---|---|
| 2002/0114536 A1 | 8/2002 | Xiong et al. |
| 2004/0061787 A1 | 4/2004 | Liu et al. |
| 2005/0259119 A1 | 11/2005 | Zhu |
| 2006/0268131 A1 | 11/2006 | Cutler |
| 2007/0132863 A1 | 6/2007 | Deguchi |
| 2009/0263045 A1 | 10/2009 | Szeliski et al. |
| 2010/0150472 A1 | 6/2010 | Chen |
| 2010/0194851 A1 | 8/2010 | Pasupaleti et al. |
| 2011/0293175 A1 | 12/2011 | Yoon et al. |
| 2013/0322753 A1* | 12/2013 | Lim .................... G06T 5/50 382/167 |
| 2015/0172545 A1 | 6/2015 | Szabo et al. |
| 2015/0288864 A1 | 10/2015 | Ollier |

OTHER PUBLICATIONS

Great Britain Examination Report under Section 18(3) in Great Britain Application No. GB1706111.0, dated Oct. 1, 2018, 5 pages.
Great Britain Search Report under Section 17(6) in Great Britain Application No. GB1706111.0, dated Oct. 1, 2018, 3 pages.
Great Britain Search Report under Section 17(5) in Great Britain Application No. GB1706111.0, dated Sep. 25, 2017, 4 pages.
International Search Report and Written Opinion in Application No. PCT/GB2017/051070, dated Sep. 28, 2017.
Szelinski [online], "Image Alignment and Stitching: A tutorial," Dec. 10, 2006, [retrieved on Mar. 20, 2009], retrieved from:URL<http://pages.cs.wisc.edu/~dyer/ai-qual/szelinski-tr06.pdf>, 89 pages.

* cited by examiner

BLENDING IMAGES

CROSS-REFERENCE TO RELATED APPLICATIONS

This application is a national stage of and claims priority under 35 U.S.C. § 371 to PCT Application No. PCT/GB2017/051070, filed on Apr. 18, 2017, which claims priority to Great Britain Application No. GB 1606746.4, filed on Apr. 18, 2016. The contents of both of these priority applications are hereby incorporated by reference in their entirety.

This invention relates to methods and apparatus for stitching together multiple images.

A "normal" camera lens is one that produces images that generally look natural to the human eye because there is no significant expansion or contraction distorting the perspective. Special lenses—such as fish-eye lenses—can be used to generate images with very wide angles of view. Typically the perspective in these images will look distorted to the human observer. Some cameras may use multiple lenses, or a mechanism for moving a single lens between different imaging positions, to generate a wide angle image. Multiple camera images can be stitched together to form a single image having a wider field of view that any of the lenses would be capable of generating individually. It is possible to stitch together enough images to create a 360° image.

Stitching together multiple overlapping images is typically a process that is done offline because of the time it takes to process the overlapping regions of the images to a high enough standard for the stitching to be undetectable by the human eye. This makes the systems that generate those images unsuitable for handling video images, which would require the stitching to be performed substantially in real time. Any real time stitching systems that do exist tend to be physically large and generate a lot of heat, which makes them unsuitable for being incorporated into cameras. Therefore, there is a need for a stitching system that can efficiently blend images together in substantially real time.

According to a first aspect, there is provided a filtering apparatus configured to combine a plurality of pixels in a first image by applying a respective weight to each of those pixels to form a pixel in a second image, receive pixels that are representative of an arbitrarily-shaped image in which one or more of the plurality of pixels required to form the pixel in the second image is not present, map the arrangement of present and non-present pixel(s) in that required plurality of pixels to one or more respective weights that should be applied to the present pixels in order to form the pixel in the second image from the pixels present in the arbitrarily-shaped image and apply the respective weights to the present pixel(s) to form the pixel in the second image.

Other aspects may include one or more of the following: The filtering apparatus may be configured to map the arrangement of present and non-present pixels to one or more respective weights in dependence on a kernel that provides said mapping for arrangements of present and non-present pixels that are possible given the number of the plurality of pixels that are required to form a pixel in the second image.

The filtering apparatus may comprise a buffer configured to receive incoming data denoting an arrangement of present and non-present pixels from the first image, apply the respective weights, in accordance with the mapping, to the data representing the present pixels to obtain data denoting the arrangement of non-present pixels and weighted present pixels and combine the data denoting the arrangement of non-present pixels and weighted present pixels to generate the pixel in the second image.

The filtering apparatus may be configured to map the arrangement of present and non-present pixels to the respective weights using a mapping that assumes a constant difference in one or more pixel values between neighbouring ones of the present and non-present pixels in the required plurality of pixels. The filtering apparatus may be configured to apply the respective weight to one or more pixel values associated with each pixel in the first image to generate a pixel value associated with the pixel in the second image. The filtering apparatus may be configured to multiply the one or more pixel values associated with each pixel in the first image by the respective weight associated with those pixels and sum the results to generate a pixel value associated with the pixel in the second image.

The filtering apparatus may comprise a reduce filter and/or an expand filter.

According to a second aspect, there is provided a method comprising combining a plurality of pixels in a first image by applying a respective weight to each of those pixels to form a pixel in a second image, receiving pixels that are representative of an arbitrarily-shaped image in which one or more of the plurality of pixels required to form the pixel in the second image is not present, mapping the arrangement of present and non-present pixel(s) in that required plurality of pixels to one or more respective weights that should be applied to the present pixels in order to form the pixel in the second image from the pixels present in the arbitrarily-shaped image and applying the respective weights to the present pixel(s) to form the pixel in the second image.

According to a third aspect, there is provided an apparatus for forming a blended image by combining multiple images, configured to identify a location in a first image and a location in a second image that will coincide when the two images are overlapped to form the blended image, determine, for each location, a distance between it and an edge of its respective image and form a pixel in the blended image in dependence on a distance determined in respect of at least one of the locations relative to the sum of the distances determined for both of the locations.

The apparatus may be configured to determine each distance to be a distance over a sphere. The apparatus may be configured to determine each distance to be a shortest great circle distance.

The apparatus may be configured to determine, for each of the locations in the first and second images, a respective normalised alpha value and to form a pixel in the blended image in dependence on those normalised alpha values. The apparatus may be configured to form the pixel in the blended image by multiplying one or more pixel values that correspond to the locations in the first and second image with the respective normalised alpha value determined for each of those locations. The first image and the second image may both correspond to a particular level in a pyramid of images that comprises multiple levels. The apparatus may be configured to determine a respective normalised alpha value for the locations in the first and second images in dependence on the particular level in the pyramid that the first and second images correspond to. The apparatus may be configured to use, as respective normalised alpha values for the locations in the first and second images, normalised alpha values that have been calculated in a manner that is dependent on the particular level in the pyramid that the first and second images correspond to.

The apparatus may be configured to determine a respective normalised alpha value for a location in the first image or the second image in dependence on a distance determined in respect of that location relative to the sum of the distances determined for both of the locations. The apparatus may be configured to determine a respective normalised alpha value for a location in the first image or the second image to be a preset value.

The apparatus may be configured to identify the location in the first image or the second image that is associated with the larger determined distance and form the pixel in the blended image in dependence on a pixel in the first or second image that is associated with that location.

The apparatus may be configured to form the pixel in the blended image by combining a pixel in the first image and a pixel in the second image that are each associated with the locations in their respective images that will coincide when the two images are overlapped.

The apparatus may be configured to combine the pixels in accordance with weights that are based on the distance determined for the locations in their respective images relative to the sum of those distances for the locations in both images.

According to a fourth aspect, there is provided a method comprising identifying a location in a first image and a location in a second image that will coincide when the two images are overlapped to form the blended image, determining, for each location, a distance between it and an edge of its respective image and forming a pixel in the blended image in dependence on a distance determined in respect of at least one of the locations relative to the sum of the distances determined for both of the locations.

According to a fifth aspect, there is provided an apparatus for combining multiple images to form a blended image, configured to identify regions of overlap: (i) in a first image and in a second image, corresponding to where those first and second images will overlap each other in the blended image; and (ii) in the first image and in a third image, corresponding to where those first and third images will overlap each other in the blended image, identify an image quality associated with each region of overlap, determine a gain for each image that, when applied to the image as a whole, will minimise a sum of: (i) a difference between the image qualities associated with the regions of overlap in the first and second images; and (ii) a difference between the image qualities associated with the regions of overlap in the first and third images; and apply the respective gains to the first, second and third images.

Other aspects may include one or more of the following: The apparatus may be configured to identify the image quality associated with each pixel in a region of overlap, multiply that image quality with the image quality associated with a corresponding pixel in the image with which said region overlaps and sum the multiplication results generated for the pixels comprised in said region of overlap. The sum results may represent elements of a matrix and the apparatus may be configured to calculate symmetric elements of said matrix only once. The apparatus may also be configured to store symmetric elements of said matrix only once.

The apparatus may be configured to determine the gain for each image in dependence on a parameter that is independent of an image quality associated with any of the images. The parameter may be the same for each image, whereby the parameter exerts an overall control on the gains determined for each image. The apparatus may be configured to determine the gains using a least squares calculation.

Each image may be a camera image and each camera image may be associated with an individual level of brightness. The image quality may be luminance.

According to a sixth aspect, there is provided a method comprising identifying regions of overlap: (i) in a first image and in a second image, corresponding to where those first and second images will overlap each other in the blended image; and (ii) in the first image and in a third image, corresponding to where those first and third images will overlap each other in the blended image, identifying an image quality associated with each region of overlap, determining a gain for each image that, when applied to the image as a whole, will minimise a sum of: (i) a difference between the image qualities associated with the regions of overlap in the first and second images; and (ii) a difference between the image qualities associated with the regions of overlap in the first and third images and applying the respective gains to the first, second and third images.

The present invention will now be described by way of example with reference to the accompanying drawings. In the drawings.

Figure 12A:
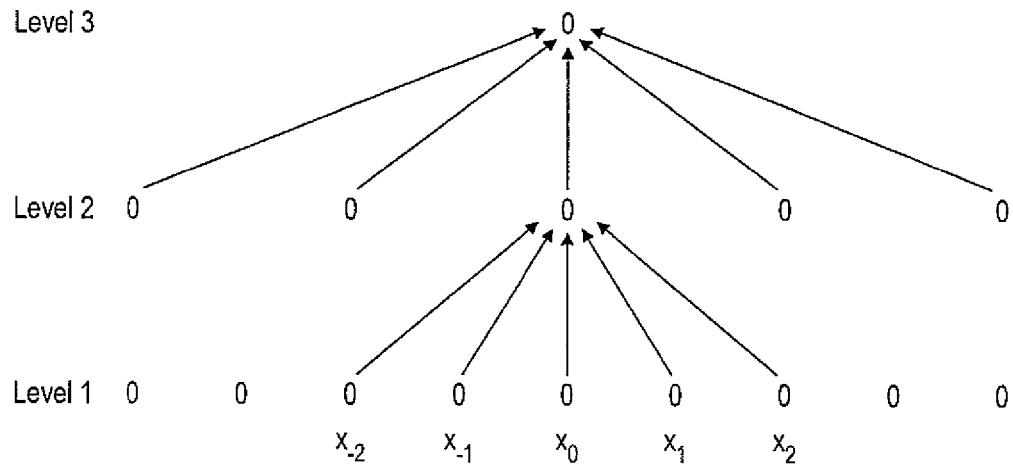
Figure 13:
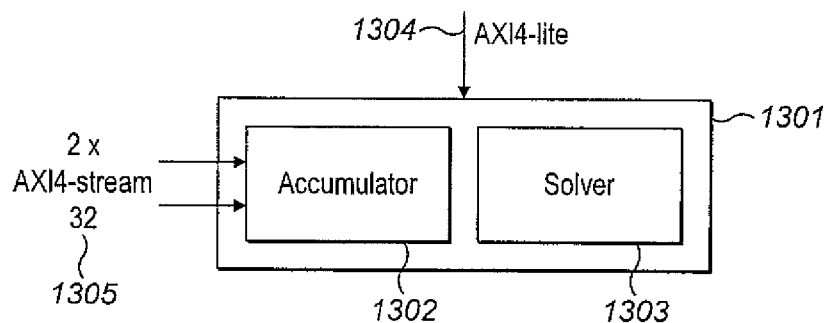
Figure 14:
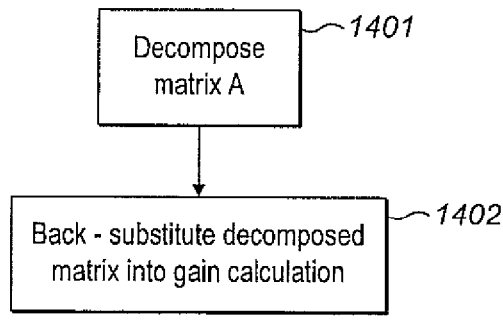

FIGS. 12a and b relate to combining pixels to form a reduced image;

FIG. 13 shows an example of a gain compensation block;

FIG. 14 shows an example of an algorithm for solving a linear system; and

Figure 15:
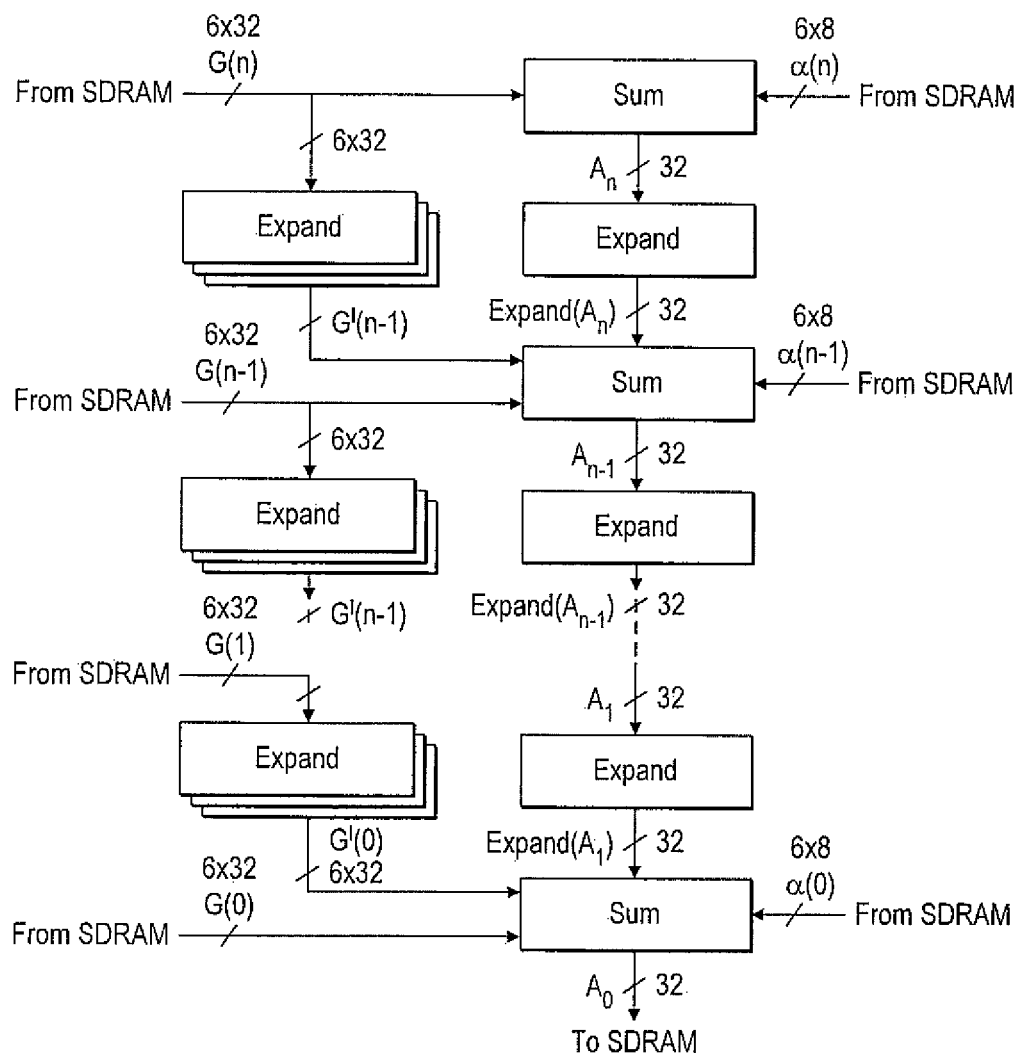

FIG. 15 shows an example of a pyramid sum block.

Figure 1:
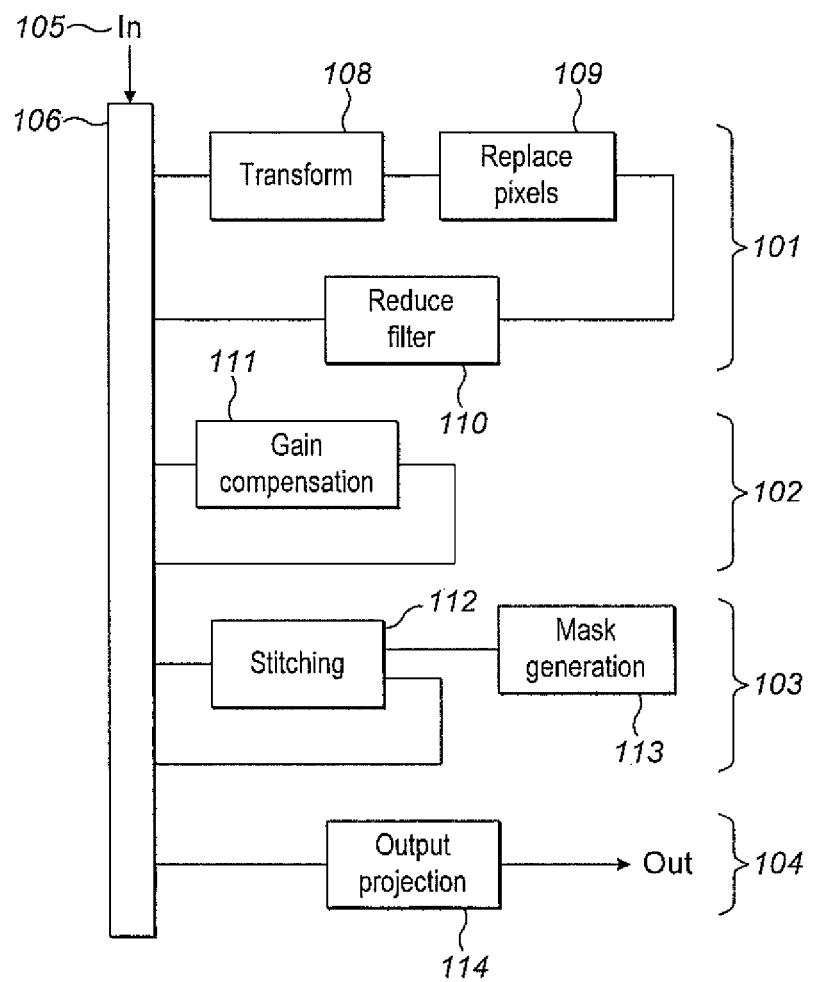
FIG. 1 shows an example of an image processing pipeline.
Figure 2:
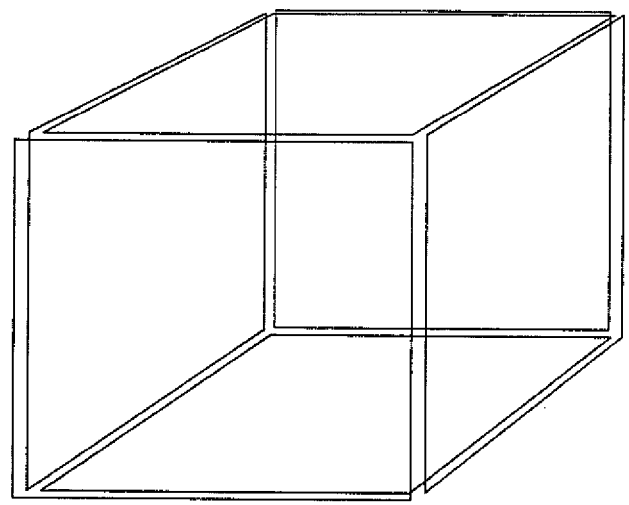
FIG. 2 shows an example of an arrangement of camera images.

A high-level example of an image processing pipeline for stitching together multiple images is shown in FIG. 1. The images could be any type of image, including camera images. The pipeline represents three general processes: transform and filtering 101, gain compensation 102, stitching 103 and output projection 104. The pipeline may be configured to receive multiple images 105 via a bus 106. In one example, the images may represent six photographs taken by six individual cameras. Each camera may represent one face of a cube. An example of such an image arrangement is shown in FIG. 2. In FIG. 2 the images are shown as non-overlapping for simplicity but it should be understood that the individual images could overlap or be arranged differently, and also that the number of images could be fewer or greater than six.

The incoming images are received via a bus 106. The transform block 108 receives the incoming frames and projects from the image space into an intermediate projection space. This is a projection that is used internally by the pipeline to combine the images.

One option is to use a cube-map representation where the incoming images are projected into six separate image planes, one for each face of a cube. The stitching can then be performed on each face independently. In some implementations this cube map representation will coincide with the cameras also being arranged in a cube, but the same projection could be used for any arrangement of cameras. Equally any suitable projection could be used and the ideas described herein are not limited to cube mapping. Other suitable projections include sphere mapping projections, equal area projections such as Gall-Peters and cube-mapped rectilinear projections.

The transform block may be followed by a series of low pass filters, represented by reduce filter block 110. The images output by the transform block may be arbitrarily-shaped, resulting in some of the pixels that would ordinarily be used to generate the reduced images being missing. The reduce filter block may thus be preceded by replace pixels block 110. (In practice this block may be incorporated within the hardware of the reduce filter block). The output of the transform and filtering process is a series of decimated images generated from each camera frame. These images will ultimately be used by stitching block 112 to create a blended image.

Each camera may have its own independent settings, including exposure, so the transform and filtering process may be followed by gain compensation block 111 to adjust one or more qualities associated with each image so that any differences between the camera settings do not affect the cohesiveness of the eventual combined image.

The stitching block 112 may be configured to blend together individual images. This may be achieved using a multiband blend process. Each level of the process may blend together decimated representations of the original camera images. This process may be performed over multiple levels, with each successive level of the process blending representations that are progressively decimated with respect to the original camera images. The balance of what each overlapping image contributes to the eventual combined image is controlled by an alpha mask, which may be provided to the stitching block by mask generation block 112.

The output projection block 114 may be configured to transform the combined image into a selected output projection.

The replace filter, gain compensation and mask generation blocks are described in more detail below with reference to FIGS. 4 to 9.

Replace Pixels

Figure 3:
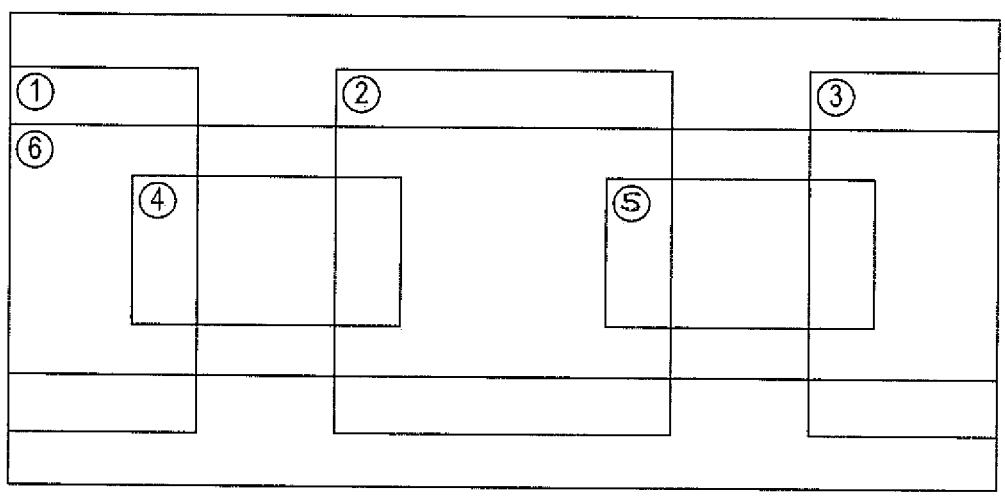
FIG. 3 shows an example of overlapping images.

To form blended versions of the original images will usually require the individual images (or their representations) to be overlapped with each other. An example is shown in FIG. 3, in which six images representing spherical content are overlapped to form a blended version that represents the original content as a two-dimensional panorama. Although the images are shown as being substantially rectangular in FIG. 3, this is for the purposes of example only. In practice the images are likely to have been distorted into arbitrary shapes by the initial projection to project the camera images onto the two-dimensional image plane. This is represented in FIG. 4 by arbitrarily shaped image 401.

The process of stitching the images together typically involves multiple levels of filtering, whether that is to generate decimated images or to expand decimated images. Each level of filtering generates pixels for the image at the next level in dependence on pixels at the current level. This process is complicated by having to process images that are arbitrarily-shaped because some of the pixels that would ordinarily be used to form the pixels in the next level may be missing.

Figure 4:
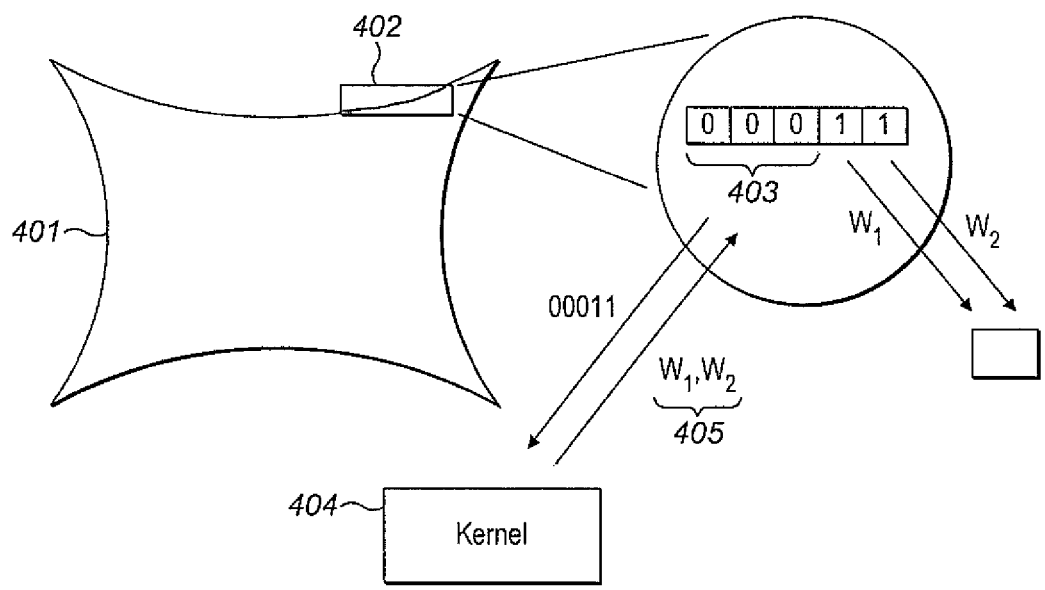
FIG. 4 shows an example of generating new pixels from patterns of missing and non-missing pixels.

This is illustrated in FIG. 4. Image 401 is arbitrarily shaped and as a consequence the group of pixels 402 that should be combined to form a new pixel in the reduced image of the next level is missing three pixels 403. The filtering apparatus comprised in the image processing pipeline may be configured to map this particular pattern of missing and non-missing pixels to one or more respective weights that should be applied to the pixels that are present so as to form the pixel for the next level. One option for achieving this mapping is by way of a kernel 404 that stores the appropriate weights 405 for each possible combination of present and non-present pixels given the number of pixels that are needed to form the pixel of the next level.

Figure 5:
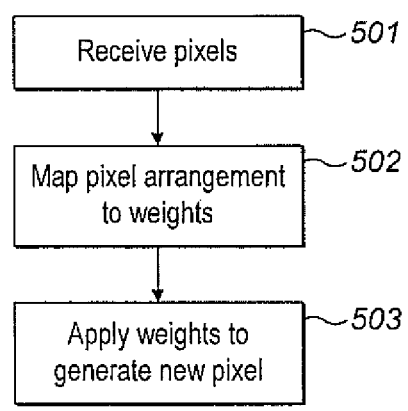
FIG. 5 shows an example of a method for generating new pixels.

An overview of the process performed by the filtering apparatus is shown in FIG. 5. In step 501 the filtering apparatus receives pixels that are representative of an arbitrarily-shaped image in which one or more of the plurality of pixels required to form a new pixel is not present. In step 502 the specific arrangement of present and non-present pixels in the group of pixels that will generate the new pixel is mapped to a set of weights. Those weights are then applied to the present pixels to generate the new pixel (step 503).

The pixels in one level can form a new pixel by contributing all or part of their own particular properties to the new pixel. Each pixel is likely to be associated with its own set of pixel values. It is these values that define how the pixel appears to the viewer, e.g. when displayed on a screen. Each pixel value may define some aspect of the pixel's intensity, e.g. the relative proportions of red, green and blue light that make up that pixel. Each pixel may be represented as respective red, green and blue values, in accordance with the RGB colour model.

In some of the examples set out below a group of pixels in the current image are combined to form a single pixel in the subsequent image. This is for the purposes of example only, and it should be understood that this technique could be used to map any number of a first group of pixels to any number of a second group of pixels.

Gain Compensation

The gain compensation block is suitably configured to harmonise one or more image qualities between the different images that are to be combined into a single image. These may be qualities, such as brightness, that can vary from image to image due to the settings of individual cameras. If these differences are not harmonised, the risk is that the individual images that go into making up the combined image will be perceptible to the human viewer.

Figure 6:
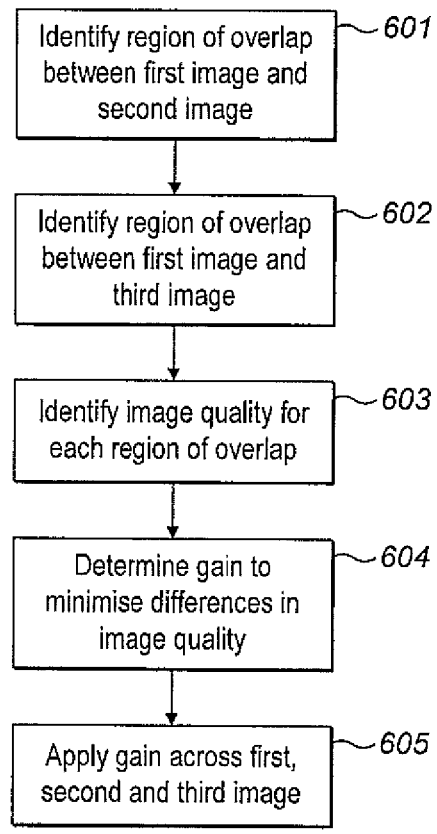
FIG. 6 shows an example of a method for determining gain.

An overview of the process performed by the gain compensation block is shown in FIG. 6. In steps 601 and 602 regions of overlap are identified between: (i) a first image and a second image; and (ii) the first image and a third image. These regions of overlap suitably correspond to where those first and third images will overlap each other in the blended image, e.g. as shown in FIG. 4. The overlap regions are predetermined by the expected configuration of the cameras and are likely to be precalculated. For the hardware, therefore, the step of identifying the regions of overlap may simply comprise being provided with the results of those precalculations.

The next step is to identify an image quality associated with each region of overlap (step 603). This could be any image quality but one suitable example is brightness or luminance, which can be calculated from the pixel RGB values from the overlap region in question.

In step 604, a gain is determined for each image. This may be calculated to minimise the summed differences between the compensated pixels in overlapping regions of the images, across all of the overlapping regions that will occur in the combined image.

For example, with reference to FIG. 3, the aim is to find a respective gain for each image that will result in the pixels in images 2 and 4 and images 2 and 5 being as close as possible in terms of brightness. Because the respective gains will apply to the whole of each image, it is set as a compromise between the different overlap regions within a single image, e.g. image 2 overlaps with both images 4 and 5, so the gain for this image should take into account that it will have to harmoniously blend with both of the other images. This process thus sets out to find the gains that, when applied to their respective image as a whole, will minimise a sum of: (i) a difference between the image qualities associated with the regions of overlap in the first and second images: and (ii) a difference between the image qualities associated with the regions of overlap in the first and third images. The determined gains are then applied across the whole of their respective image (step 605).

Some existing systems use the mean of a luminance associated with each image to harmonise brightness across all of the images to be combined. This is vulnerable to one image being particularly/lighter than the others, particularly if only a restricted area of each image (such as the region of overlap) is used to assess luminance. The method described herein is preferred as it balances the image qualities across multiple images more effectively and is less vulnerable to outliers.

Mask Generation

Figure 7:
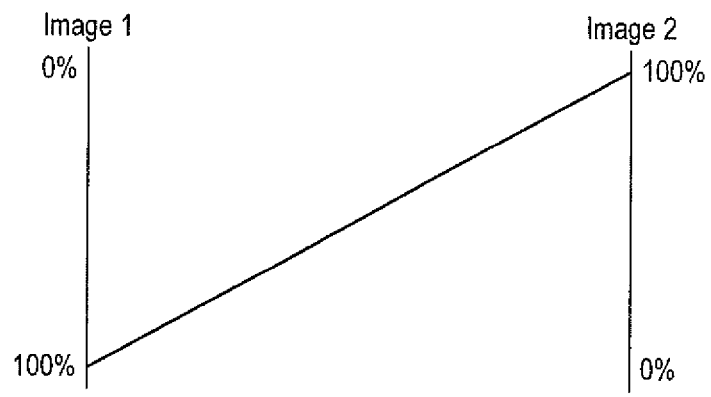
FIG. 7 shows an example of a transition region between two images.

The alpha masks govern the proportion of each overlapping image that goes into forming the pixels for the blended image. This is shown in FIG. 7 for the example of a blend that linearly changes over the width of the transition region from being 100% image 1 and 0% image 2 to being 0% image 1 and 100% image 2.

Figure 8:
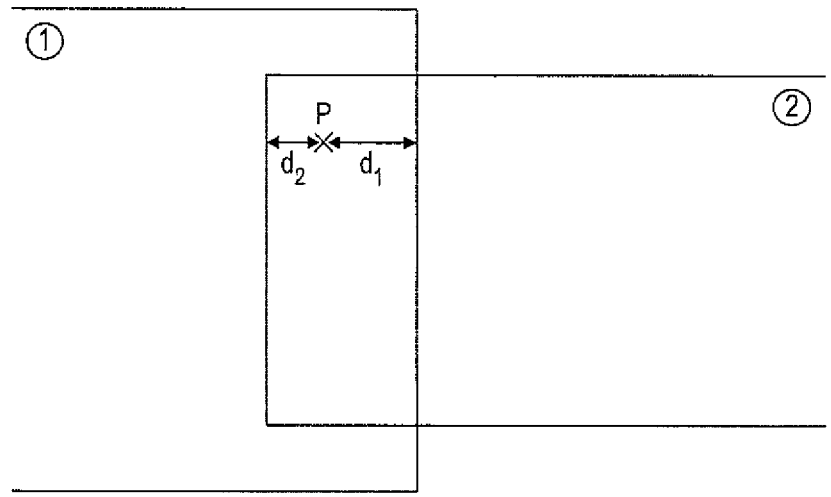
FIG. 8 shows two overlapping images that are to be blended.
Figure 9:
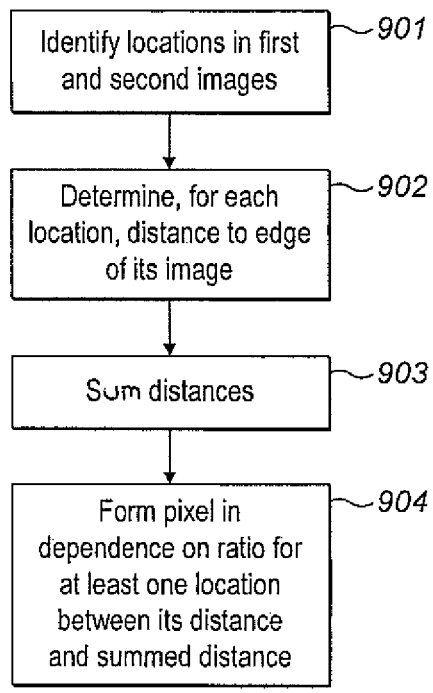
FIG. 9 shows an example of a method for determining a mask for blending two images.

In one implementation, it is preferred for the blend between two images to be controlled in dependence on the relative distance between a particular location in the blended image and a distance between that location and an edge of each of the individual images that overlap that particular location. This is shown in FIG. 8 and an example of a general method is set out in FIG. 9.

In step 901 the alpha mask block identifies a location in a first image and a location in a second image that will coincide when the two images are overlapped to form the blended image. It then determines the distance between each of those locations and an edge of its respective image (step 902). This is represented by $d_1$ and $d_2$ in FIG. 8. Those distances are then summed together (step 903). A pixel for the blended image is then formed in dependence on a distance determined in respect of at least one of the locations relative to the sum of the distances determined for both of the locations (step 904). Some examples of how this might work in practice are given in the section on Pyramid Sum below. In particular, the exact way in which the pixels are blended together may depend on what level of a pyramid the two images correspond to.

Examples of an image processing pipeline will now be described in more detail with reference to a system that is configured to process multiple images at a time to produce spherical video content.

Figure 10:
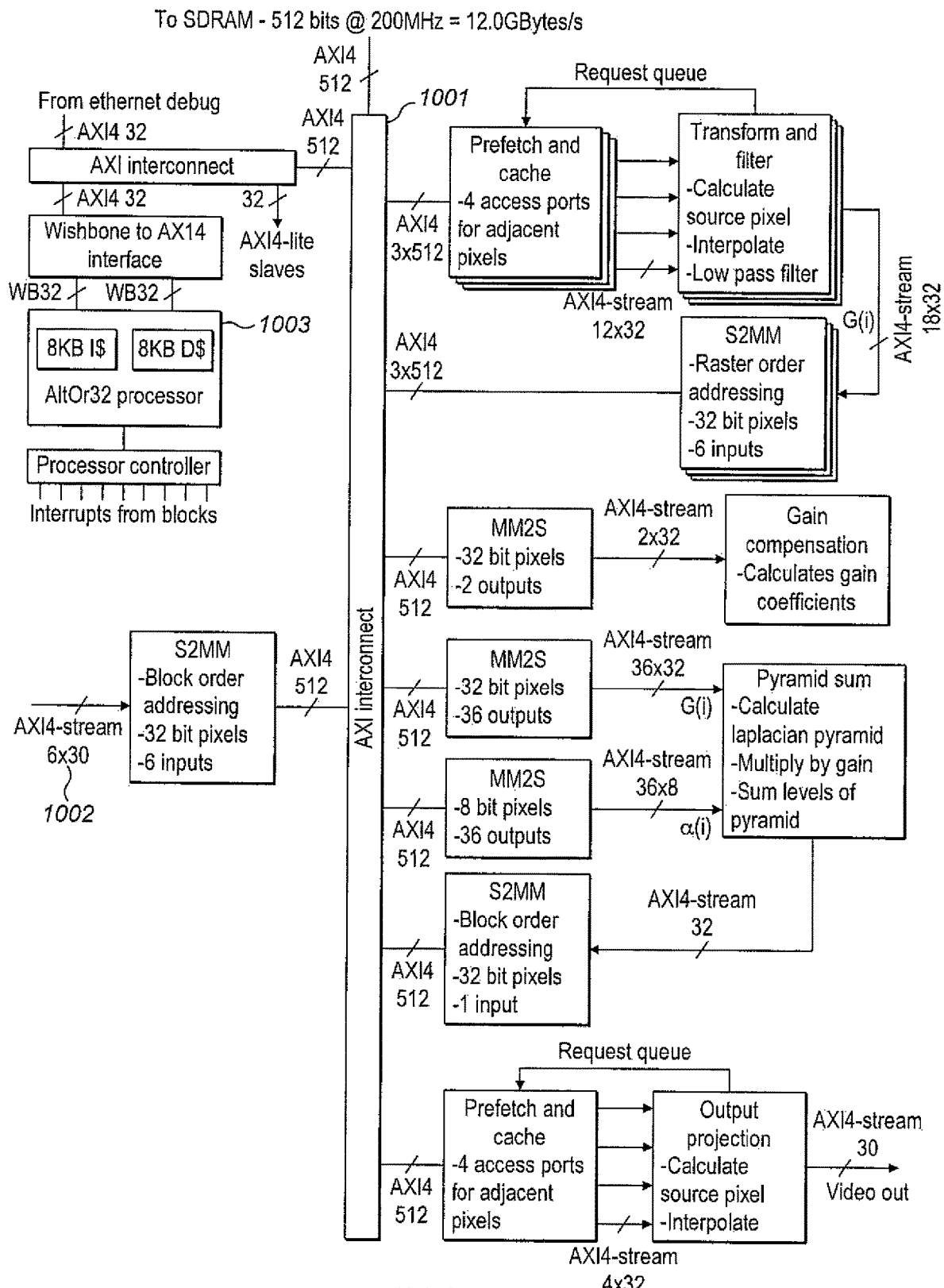
FIG. 10 shows an example of an image processing pipeline.

An example of the pipeline for this system is shown in FIG. 10.

The pipeline may be controlled by a processor 1003. The pipeline is built around a bus 1001, which forms the backbone of the system. The images enter the pipeline via input 1002, which may be implemented as a streaming interface optimised for video. In the example of FIG. 10, input 1002 includes six 30-bit video stream inputs for the camera images. All blocks may have access to smaller bus for register access and the ability to interrupt the processor if required.

The pipeline is set-up to handle six images for each video frame. These may be captured by six cameras, arranged so that each camera forms a different face of a cube. Each camera is arranged to capture an image at a predetermined frame rate. For example, each camera may produce a video output at 30 frames per second. Each camera preferably captures its respective images at the same size and resolution as the other cameras. A suitable size might be 1440×1080 pixels, for example. The cameras could equally produce images of different size and resolution from each other, but that may require some additional processing before they are stitched together.

The cameras may be synchronised or each camera may use its own clock. If the latter, the processor is responsible for synchronising the camera feeds. The time each frame is received may be recorded. The frames for each camera may be collected in a set of lists. For example, the processor could pop entries off the list to create a closest-to set. Thereafter for each frame, the top frame on each list may be taken and passed to the next stage as a synchronised set.

If the form of the current output requested by the user only uses part of the spherical content captured by the cameras, images captured by other cameras/parts of camera images may be dropped and not processed to reduce power consumption.

Transform

Figure 11:
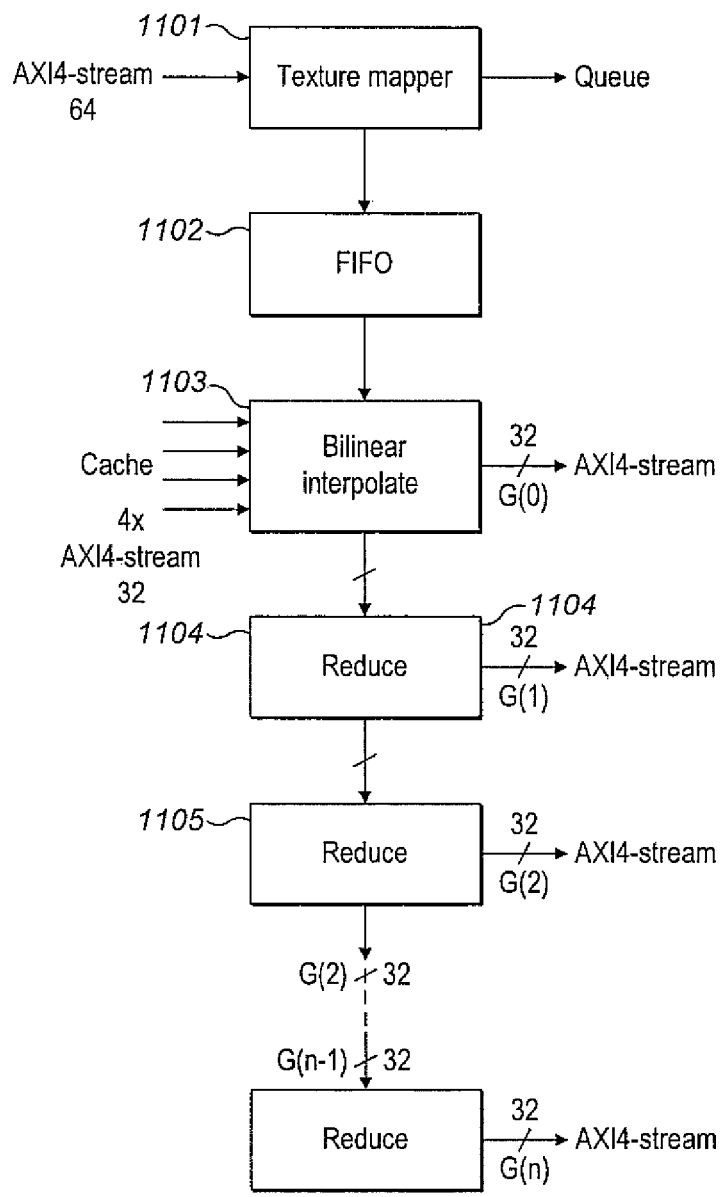
FIG. 11 shows an example of a transform and filter pipeline.

The transform and filter block serves two purposes. The first is to read the incoming frames and project from the image space into the two-dimensional image plane. The second is to create a set of low-pass filtered images for multiband blending. A block diagram showing the transform and filter block in more detail is shown in FIG. 11.

A first step is to calculate the source position for each output pixel with sub-pixel accuracy by performing an interpolation between known source positions. This calculation typically only has to be performed once for a given arrangement of the cameras and internal projection type. Thereafter it can be streamed into the texture block from memory. It could be performed by the hardware of the pipeline itself or elsewhere, e.g. in processor 1003 or in another processor, on start-up.

The incoming frames are initially processed by a texture mapper 1101. The positions of the input pixels needed by the bilinear interpolation block 1103 are sent to the cache, while the sub-pixel position information is read into buffer 1102. Once the cache returns with the data, the interpolation can be performed using the sub-pixel position information. The projected pixels may be calculated using bilinear, Bicubic or Lancoz interpolation, or any other suitable interpolation technique. In the example of FIG. 11, bilinear interpolation is used (1103).

Any suitable projection might be used internally to take the incoming camera frames from the projection implemented by the camera to the internal projection used by the image processing pipeline. For example, the cameras may be fitted with lenses that provide images that are already in the form of a fish eye projection with radial distortion. Any suitable projection might be used internally by the image processing pipeline. For example, the Gall-Peters projection has the advantage of preserving area but a cube map representation based on a rectilinear projection may offer better performance at the poles.

Any missing pixels are suitably marked in the pixel flags.

The output of the "projection block" is streamed to memory and also into a reduce filter block 1104.

Reduce Filter

The reduce filter block forms one half of a mechanism to blend together the overlapping camera images to form a combined image. This mechanism involves successively reducing each of the camera images to generate a series of progressively decimated images. The second half of the mechanism involves summing together the images at each decimation level (see section on pyramid sum).

Referring FIG. 11, the pixels that have been transformed by the transform block are streamed back to memory and also to a set of reduce filters 1105, 1106 in order to construct the pyramid. In one example, each reduce filter performs a Gaussian filter. It also subsamples by a factor of 2. Thus the output is a quarter the size of the input. In one implementation, each reduce filter down-samples the image by half in each dimension, e.g. by dropping odd rows and columns. The filter is preferably separable so that it can be performed on columns and then on rows. This ordering of operations can be helpful because the maximum size of a column is typically less than the maximum size of a row. Four lines of buffer may be required to store the intermediate column results.

An example of how a reduce filter operates is shown in FIG. 12*a*. Levels 1 to 3 show the pixels of an image as it is progressively decimated; each level is sub-sampled by a factor of 2 from the preceding level. Each pixel is computed as a weighted average of a 5×5 array of pixels in the preceding image. In FIG. 12*a*, this is shown illustratively by a row of five pixels $x_{-2}$, $x_{-1}$, $x_0$, $x_1$ and $x_2$ being weighted to form one pixel in the row of the next level.

Figure 12B:
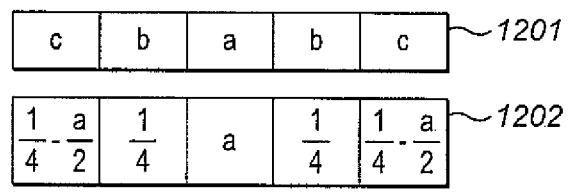

The weights that are applied to each pixel to form the next level of image are shown at 1201 in FIG. 12*b*. They may be termed the kernel. The weights are preferably symmetric (as shown), normalised (so that $a+2b+2c=1$) and each pixel at one level preferably contributes the same total weight to pixels in the level above (so that $a+2c=2b$). These restrictions enable the kernel to be simplified as shown at 1202 in FIG. 12*b*, with "a" left as a free variable.

The images that the pipeline has to process are often arbitrarily-shaped—a consequence of the transforms. Thus one or more of the pixels that should be combined to generate the reduced image will sometimes be missing. The exact pattern of missing and present pixels will also alter from one part of the arbitrarily-shaped image to another. The respective positions of the present and missing pixels within the group of pixels represent a specific pixel arrangement. This arrangement can be mapped to a particular set of weights for generating the pixel at the next level.

The collection of weights that are assigned to particular pixel arrangements may be termed a kernel. The image processing pipeline preferably uses a kernel that extends to all present/non-present pixel arrangements that are possible given the number of pixels that are combined to form a pixel in the next level. So, for a reduce filter that combines 5 pixels to form every "reduced" pixel, the kernel preferably extends to each of the 32 different arrangements that are possible.

The kernel may be constructed based on the following guidelines:

1. Fill in the missing pixels by assuming that the second derivative is constant, i.e. that the rate of change of the pixel values is constant between neighbouring pixels.
2. Assume that a is of the form $a=p/q$, where $p \in N$ and $q \in N$.
3. Choose p and q so that a gives a filter of the desired form. For example, if a is close to 0.4 the effect is of a Gaussian probability function, and the image is low pass filtered. In the specific examples described below (and in the appendix) the kernel values are scaled to integers which sum to 16. This has been done to simplify the fixed point arithmetic for real-world implementations.
4. In some instances it may not be possible to achieve the above conditions, for example if the kernel is independent of a. In these cases the kernel may be approximated with values which do meet the above conditions.

Some worked examples of how the different pixel arrangements may be converted into respective weights are detailed in the appendix. The output of this process may be a kernel, such as that shown in Table 1.

TABLE 1

Example of a reduced kernel

| Pixels present | | | | | Kernel | | | | | Output pixel present |
|---|---|---|---|---|---|---|---|---|---|---|
| -2 | -1 | 0 | 1 | 2 | -2 | -1 | 0 | 1 | 2 | |
| 0 | 0 | 0 | 0 | 0 | 0 | 0 | 0 | 0 | 0 | 0 |
| 0 | 0 | 0 | 0 | 1 | 0 | 0 | 0 | 0 | 16 | 1 |
| 0 | 0 | 0 | 1 | 0 | 0 | 0 | 0 | 16 | 0 | 1 |
| 0 | 0 | 0 | 1 | 1 | 0 | 0 | 0 | 32 | -16 | 1 |
| 0 | 0 | 1 | 0 | 0 | 0 | 0 | 16 | 0 | 0 | 1 |
| 0 | 0 | 1 | 0 | 1 | 0 | 0 | 16 | 0 | 0 | 1 |
| 0 | 0 | 1 | 1 | 0 | 0 | 0 | 16 | 0 | 0 | 1 |
| 0 | 0 | 1 | 1 | 1 | 0 | 0 | 16 | 0 | 0 | 1 |
| 0 | 1 | 0 | 0 | 1 | 0 | 11 | 0 | 0 | 5 | 1 |
| 0 | 1 | 0 | 1 | 0 | 0 | 8 | 0 | 8 | 0 | 1 |
| 0 | 1 | 0 | 1 | 1 | 0 | 8 | 0 | 8 | 0 | 1 |
| 0 | 1 | 1 | 0 | 1 | 0 | 6 | 7 | 0 | 3 | 1 |
| 0 | 1 | 1 | 1 | 0 | 0 | 6 | 4 | 6 | 0 | 1 |
| 0 | 1 | 1 | 1 | 1 | 0 | 6 | 5 | 4 | 1 | 1 |
| 1 | 0 | 0 | 0 | 1 | 8 | 0 | 0 | 0 | 8 | 1 |
| 1 | 0 | 0 | 1 | 1 | 6 | 0 | 0 | 9 | 1 | 1 |
| 1 | 0 | 1 | 0 | 1 | 3 | 0 | 10 | 0 | 3 | 1 |
| 1 | 1 | 1 | 1 | 1 | 3 | 0 | 8 | 4 | 1 | 1 |
| 1 | 1 | 0 | 1 | 1 | 1 | 7 | 0 | 7 | 1 | 1 |
| 1 | 1 | 1 | 1 | 1 | 1 | 4 | 6 | 4 | 1 | 1 |

There is no need to "replace" or "simulate" the missing pixels: the kernel provides the required weights using just the pixels that are present (as demonstrated by the example kernel in Table 1 above).

The kernel may be stored by the pipeline as a lookup table that is accessible by the filtering apparatus. It can usually be assumed that the kernel is symmetric. Thus in the example of a filter that creates a reduced image based on taking groups of five pixels, the number of arrangements that should be stored can be reduced from 32 to 18.

The pixel format is suitably one in which all three channels are stored. Each pixel can be represented as a sequence of data that defines the RGB values for that pixel. The pixel format preferably includes a flag that can be set to indicate a missing pixel.

The filtering apparatus suitably includes a buffer for receiving the incoming pixels and filtering them in accordance with the kernel. The buffer may be a First-In First-Out (FIFO) buffer. The buffer may, for example, be a five pixel wide circular buffer. The pixel data may be filtered in accordance with the kernel, i.e. the pixel values of the pixels that are present in the buffer are multiplied by their respective weights to generate intermediate results that are then summed to generate the pixel for the reduced image.

The intermediate results may need sixteen bits of precision for each channel. The filter preferably uses an eighteen-bit slot for each channel: 16 bits for the result, the seventeenth bit for the pixel present flag and leaving the top bit spare. The intermediate results are suitably signed.

The output of each reduce filter 1105 is streamed into memory and the next reduce filter 1106 in the chain (if any).

To achieve the required throughput for real-time video, the image processing pipeline may include multiple instances of the filter chains shown in FIG. 11 arranged in parallel. In one example, each of the filters shown in FIG. 11 may output 200 Mpixels/s. The total number of pixels to be processed for each frame of video data may be 14.75 Mpixels. Thus, three filter chains run in parallel could be used to achieve the required throughput of 30 frames/s.

Gain Compensation

The cameras may have individual gain controls. The exposure of each camera may be permitted to vary independently. As a result, the images from different cameras will tend to have different levels of brightness. This should be rectified before the images are combined together, and one option is to use gain compensation to normalise the overall brightness of each image.

One option is to find optimal coefficients, so that the luminance of each camera is as close as possible without being unduly affected by any camera whose gain control is significantly different from the others. In one example, the gain compensation block may be configured to use a least squares approach:

$$S = \sum_{pairs} \sum_{\substack{overlapping \\ pixels}} (g_i L_k^i - g_k L_k^j)^2 \quad (1)$$

In this equation $g_i$ is the gain coefficient of camera i. $L_k^i$ represents the luminance of the $k^{th}$ pixel in an image from camera i. S represents the sum of a difference between the adjusted luminance for every corresponding pixel in two overlapping regions, summed across all overlapping pairs. In this example, the difference is represented by the squared result of a subtraction between the two pixel values. The aim is to find the gain coefficients that minimise the value of S.

A potential flaw with equation (1) is that it can tend to minimise the differences by setting gain to zero. A preferred implementation aims to minimise the following quantity:

$$S = \sum_{i,j \in pairs} \sum_{k \in O_{ij}} \left[ (g_i L_k^i - g_k L_k^j)^2 + pL_k^{i^2}(g_i - 1) + pL_k^{j^2}(g_j - 1) \right] \quad (2)$$

In this example, $O_{ij}$ is the overlap between camera pair i, j. P is a parameter which determines the level of compensation. When P is zero, the gain coefficients are all zero. When P is very large, the gain coefficients are all one. The parameter p may be set via a register interface that receives input from a human controller. The image processing pipeline may be configured to output a live preview of the stitched images to a human controller, allowing the value of p to be tweaked manually before the stitched images are streamed to users.

This leads to the following linear problem:

$$\begin{pmatrix} (1+p)L_0^2 & -L_0L_1 & -L_0L_2 & -L_0L_3 & -L_0L_4 & -L_0L_5 \\ -L_1L_0 & (1+p)L_1^2 & -L_1L_2 & -L_1L_3 & -L_1L_4 & -L_1L_5 \\ -L_2L_0 & -L_2L_1 & (1+p)L_2^2 & -L_2L_3 & -L_2L_4 & -L_2L_5 \\ -L_3L_0 & -L_3L_1 & -L_3L_2 & (1+p)L_3^2 & -L_3L_4 & -L_3L_5 \\ -L_4L_0 & -L_4L_1 & -L_4L_2 & -L_4L_3 & (1+p)L_4^2 & -L_4L_5 \\ -L_5L_0 & -L_5L_1 & -L_5L_2 & -L_5L_3 & -L_5L_4 & (1+p)L_5^2 \end{pmatrix} \quad (3)$$

$$\begin{pmatrix} g_0 \\ g_1 \\ g_2 \\ g_3 \\ g_4 \\ g_5 \end{pmatrix} = \begin{pmatrix} pL_0^2 \\ pL_1^2 \\ pL_2^2 \\ pL_3^2 \\ pL_4^2 \\ pL_5^2 \end{pmatrix}$$

The luminance values in the matrix above are obtained by multiplying the luminance values for each overlapping pixel pair and then summing the multiplication results across the overlap region This involves reading the pixel values in the overlapping regions, accumulating those values into a matrix and a vector and then solving the linear system in order to obtain the gain coefficients for the current frame.

The gain compensation block is preferably controlled by a processor. In the example of FIG. 10, the gain compensation block is controlled by the AltOr32 processor 1003 via an AX14 interface. The processor may be configured to identify the overlapping regions of the images and cause the appropriate pixels to be streamed into the gain compensation block.

An example of the gain compensation block is shown in FIG. 13. The block is shown generally at 1301 and comprises an accumulator 1302 and a linear system solver 1303. The block receives pixels from the overlapping regions of the images via input 1305 and processor control via input 1004. Effectively the gain compensation block has two operating modes: as an accumulator that collects data and as a linear system solver and gain coefficient calculator.

Frames are streamed into the accumulator block in pairs. Preferably the processor ensures that corresponding pairs of pixels are synchronised. If either of the pair of incoming pixels is missing, then the pixel is skipped. When both pixels are present, the luminescence of the pixel should be estimated. One option is to use the definition of luma from Rec. 709:

$$Y = 0.2126R + 0.7152G + 0.0722B.$$

A 10-bit estimate can be found by calculating:

$$L = (13933R + 46871G + 4731B + 32768) >> 16$$

Note that no gamma correction is performed (at least in some implementations).

The block then uses these to update the appropriate values in the luminance matrix (denoted matrix "A" below), depending on the indices of the incoming pixel pair. The entries in the matrix are preferably stored with 64-bits of precision to allow enough room for values to accumulate without overflow. The gain compensation block suitably uses the symmetry of the matrix to calculate and/or store 21 matrix elements instead of 36. This is possible because some of the elements of the matrix are symmetric, i.e. they represent mathematically identical terms (such as $-L_1L_0$ and $-L_0L_1$, for example).

The linear system solver may be based around a simple ALU with two interfaces for data input and output. In one example these two interfaces may be implemented by two AXI4-Stream interfaces. The instruction set may be limited to opcodes which are needed to solve the linear system. Registers may be in Q32.32 format and the ALU may be configured to perform the arithmetic to be consistent with this.

The algorithm used by the linear system solver to solve the linear system is shown in FIG. 14. In step 1401 the matrix is decomposed into LDLT form. L is a lower unitriangular matrix and D is a diagonal matrix. The related equations are as follows:

$$D_j = A_{jj} - \sum_{k=1}^{j-1} L_{jk}^2 D_k \quad (4)$$

$$L_{ij} = \frac{1}{D_j}\left(A_{ij} - \sum_{k=1}^{j-1} L_{ik}L_{jk}D_k\right), i > j$$

In step 1402, the decomposed luminance matrix is substituted back into equation (3) above, to determine an optimal gain value for each image. The resulting gain coefficients may be read by the processor, e.g. via a register interface. The appropriate gain can then be applied to each image. The gain coefficient can be multiplied by each RGB channel independently, since Luma is linear in RGB.

The memory bandwidth required by the gain compensation block can be reduced by applying it to the images at a different level of the pyramid.

Pyramid Sum

The pyramid sum block performs the "multiband blend" across the decimated images generated by the reduce filter block. This block outputs the fully blended frame. A block diagram is shown in FIG. 15.

In one example, each expand filter 1501 performs a Gaussian filter. It also upsamples by a factor of 2. Thus the output is 4 times the size of the input. Each expand filter is thus a match for its equivalent reduce filter in the reduce filter block. The filter is preferably separable so it can be performed on columns and then rows. Four lines of buffer may be required to store the intermediate column results.

Each level of the pyramid will typically include multiple expand filters arranged in levels, as shown in FIG. 15.

The sum blocks 1502 perform the following calculation at level k in the pyramid:

$$A_k = \text{Expand}(A_{k+1}) + \sum_{\text{Frame } i}\sum_{\text{Pixels } j} g_i \alpha_{ij}(k)(G_{ij}(k) - \text{Expand}(G_{ij}(k+1))) \quad (5)$$

$g_i$ is the gain coefficient and $\alpha_i$ is the alpha mask for camera $G_i$.

The lowest level of the pyramid sum computes:

$$A_n = \sum_{\text{Frame } i}\sum_{\text{Pixels } j} g_i \alpha_{ij}(n) G_{ij}(n) \quad (6)$$

The sum blocks should also stream in the alpha masks for all 6 cameras.

The alpha masks may be determined offline by an external computer and uploaded to the image processing pipeline. The alpha masks may be determined in dependence on the following algorithm.

Given a particular point P on the world sphere, $d_i$ is calculated for each image i that intersects that point. $d_i$ may be defined as the shortest great-circle distance from P to the edge of i.

Having calculated $d_i$ for all intersecting pictures, each one may be normalised thus:

$$\alpha_i = \frac{d_i}{\sum_j d_j} \quad (7)$$

There are several options for obtaining the final alpha value:

- Use $\alpha_i$ directly as the alpha value. This gives a smooth blend, but somewhat negates the effect of the multiband blending technique, as it produces a wider alpha slope at higher levels.
- Pick the highest value of $\alpha_i$ and assign that image an alpha value of 1.0. All other images have an alpha value of 0.0. This produces a sharp line between images, making the multiband blend more effective.
- A compromise between these two extremes.

In an example that achieves a compromise between the two extremes described above, the final alpha value for each image may be dependent on the level of the pyramid that the image is in. For example, the final alpha value for a point in an image i could be one of two or more different values, depending the pyramid level. One of the possible values could be the normalised alpha value. Another of the possible values could be preset value, such as zero. This is described in more detail below.

In one implementation, the normalised alpha mask value ($\alpha_i$) is calculated from the non-normalised values ($d_i$). The calculation that is performed to determine the final alpha values for the alpha masks depends on the level of the pyramid. For example, at the lowest level of the pyramid the calculation may be:

$$\alpha_i = \begin{cases} \left\lfloor \frac{1024 d_i}{\sum_j d_j} \right\rfloor + s_i, & \sum_j d_j(k) \neq 0 \\ 0, & \sum_j d_j(k) = 0 \end{cases} \quad (8)$$

The values $s_i$ take the value 0 or 1 and are used to ensure that the sum of the normalised alphas is equal to 1024. The specific value of 1024 has been chosen for this example because it relates to an implementation in which the non-normalised alpha values are 10 bit unsigned numbers. The alpha values are thus normalised to a scale that corresponds to the possible size variation in the non-normalised alpha values. A different scale could equally be used, e.g. a specific value of 512 could be substituted for 1024 if 9 bit unsigned numbers were used to represent the non-normalised alpha values. This principle also applies to the examples below, where the specific value of 1024 can be altered to whatever value is appropriate for a given implementation.

The number of non-zero $s_i$ that will be needed is calculated as:

$$S = 1024 - \sum_i \left\lfloor \left| \frac{1024 d_i}{\sum_j d_j} \right| \right\rfloor \quad (9)$$

The S lowest index non-zero $\alpha_i$ values are chosen and given $s_i=1$. The remaining channels are given $s_i=0$.

For other levels of the pyramid, the normalised value may depend on the number of non-normalised alpha values that are equal to the maximum non-normalised alpha for the overlapping images. The values are shown in Table 2. In this table, it is assumed that the maximum alpha values are stored in the lowest indices (but this need not be the case). Thus, in cases where multiple non-normalised alphas are equal to the maximum, the channels with the lower index take the larger values. The values in the table have been chosen so that the sum of the normalised alphas is always 1024.

TABLE 2

Alpha max table

| Number equal to max | $\alpha_0$ | $\alpha_1$ | $\alpha_2$ | $\alpha_3$ | $\alpha_4$ | $\alpha_5$ |
|---|---|---|---|---|---|---|
| All equal to zero | 0 | 0 | 0 | 0 | 0 | 0 |
| 1 | 1024 | 0 | 0 | 0 | 0 | 0 |
| 2 | 512 | 512 | 0 | 0 | 0 | 0 |
| 3 | 342 | 341 | 341 | 0 | 0 | 0 |
| 4 | 256 | 256 | 256 | 256 | 0 | 0 |
| 5 | 205 | 205 | 205 | 205 | 204 | 0 |
| 6 | 171 | 171 | 171 | 171 | 170 | 170 |

The approach described above may achieve the best of both worlds, by achieving a smooth blend at lower levels and achieving a sharper line between blends at higher levels.

The expand filter used for the $A_k$ frames can assume that all pixels are present. In this case the Gaussian kernel reduces to a simpler form. This means that only two lines of buffer are required.

This block can be extended to output mipmaps for each level. This may generate a one-third increase in write memory bandwidth.

Output Projection

This block takes the final blended image and performs the output projection. Suitable types of output projection include rectilinear, equidistant fisheye, full stitch Gall-Peters and full stitch equirectangular. The output projection block then outputs the frame over the DisplayPort interface. The block structure of the transform is suitably the same or similar to that of the transform and filter block.

The output projection block should transpose rows and columns in order to undo the transpose performed by the transform and filter block.

Each projection tends to oversample the final blended image, so the lower mipmaps of the pyramid may not be needed. Another option, if it is desired to output at a resolution that is lower than the top level of the pyramid, would be to use the mipmaps with a cubic interpolation method.

The block may be configured to always output the same shape of frame, e.g. a 3840×1920 frame, and to add black bars where appropriate if the number of pixels output by the projection block does not fill the frame.

The structures shown in the figures herein are intended to correspond to a number of functional blocks in an apparatus. This is for illustrative purposes only. The figures are not intended to define a strict division between different parts of hardware on a chip or between different programs, procedures or functions in software. In many embodiments, some or all of the procedures described herein are likely to be performed predominantly in hardware. For example, any or all of the functional blocks comprised in the image processing pipeline described above might be implemented on an integrated circuit, including an appropriately configured application specific integrated circuit (ASIC) or a field-programmable gate array (FPGA). In some implementations, some or all of the procedures described herein may be implemented by a processor acting under software control. Any such software is preferably stored on a non-transient computer readable medium, such as a memory (RAM, cache, FLASH, ROM, hard disk etc.) or other storage means (USB stick, FLASH, ROM, CD, disk etc). Any of the functional units described herein might be implemented using processing power that is accessible as part of the cloud.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

APPENDIX: WORKED EXAMPLES OF KERNEL EXTENSION

This appendix includes a number of worked examples for how the weights to be applied to a specific arrangement of present and non-present pixels may be determined.

In these examples, the value of each pixel in the row in the next decimated image is generated from five pixels in the current image. These five pixel values are labelled as:

| $x_{-2}$ | $x_{-1}$ | $x_0$ | $x_1$ | $x_2$ |
|---|---|---|---|---|

Missing pixels are denoted below as $x_i'$. The headings in this section describe which pixels are missing or present (where a 'one' represents a pixel that is present and a 'zero' represents a pixel that is missing).

00011

The missing pixels are interpolated as:

$$x_0' = 2x_1 - x_2$$

$$x_{-1}' = 3x_1 - 2x_2$$

$$x_{-2}' = 4x_1 - 3x_2$$

Substituting these values and multiplying by 16 gives the kernel:

| 0 | 0 | 0 | 32 | -16 |
|---|---|---|---|---|

00101
The missing pixels are interpolated as:

$$x_1' = \tfrac{1}{2}(x_0 + x_2)$$

$$x_{-1}' = \tfrac{1}{2}(3x_0 - x_2)$$

$$x_{-2}' = 2x_0 - x_2$$

Substituting these values and multiplying by 16 gives the kernel:

| 0 | 0 | 16 | 0 | 0 |
|---|---|----|---|---|

00110
The missing pixels are interpolated as:

$$x_2' = 2x_1 - x_0$$

$$x_{-1}' = 2x_0 - x_1$$

$$x_{-2}' = 3x_0 - 2x_1$$

Substituting these values and multiplying by 16 gives the kernel:

| 0 | 0 | 16 | 0 | 0 |
|---|---|----|---|---|

00111
The missing pixels are interpolated as:

$$x_{-1}' = 2x_0 - x_1$$

$$x_{-2}' = 2x_0 - x_2$$

Substituting these values and multiplying by 16 gives the kernel:

| 0 | 0 | 16 | 0 | 0 |
|---|---|----|---|---|

01001
The missing pixels are interpolated as:

$$x_1' = \tfrac{1}{2}(x_{-1} + 2x_2)$$

$$x_0' = \tfrac{1}{2}(2x_{-1} + x_2)$$

$$x_{-2}' = \tfrac{1}{3}(4x_{-1} - x_2)$$

In this case the unscaled kernel is

| 0 | $\tfrac{2}{3}$ | 0 | 0 | $\tfrac{1}{3}$ |
|---|---|---|---|---|

This is an example where there is no scaling factor that can make the kernel values integers and the sum 16. The following is one solution, and gives a close approximation:

| 0 | 11 | 0 | 0 | 5 |
|---|----|---|---|---|

01010

By symmetry, the kernel is:

| 0 | 8 | 0 | 8 | 0 |
|---|---|---|---|---|

01011
The missing pixels are interpolated as:

$$x_0' = \tfrac{1}{2}(x_{-1} + x_1)$$

$$x_{-2}' = \tfrac{1}{2}(3x_{-1} - x_1)$$

Substituting these values, gives the unscaled kernel as:

| 0 | $\tfrac{5}{8} - \tfrac{a}{4}$ | 0 | $\tfrac{1}{8} + \tfrac{3a}{4}$ | $\tfrac{1}{4} - \tfrac{a}{2}$ |
|---|---|---|---|---|

The closest value of a to 0.4 that will give the required result is 0.5, which gives a kernel of:

| 0 | 8 | 0 | 8 | 0 |
|---|---|---|---|---|

01101
The missing pixels are interpolated as:

$$x_1' = \tfrac{1}{2}(x_0 + x_2)$$

$$x_0' = \tfrac{1}{3}(2x_{-1} + x_2)$$

$$x_{-2}' = \tfrac{1}{3}(4x_{-1} - x_2)$$

Substituting these values the unscaled kernel is:

| 0 | $\tfrac{3}{4} - a$ | $\tfrac{3a}{2} - \tfrac{1}{8}$ | 0 | $\tfrac{3}{8} - \tfrac{a}{2}$ |
|---|---|---|---|---|

The closest value of a to 0.4 that will give the required result is 0.375, which gives a kernel of:

| 0 | 6 | 7 | 0 | 3 |
|---|---|---|---|---|

01110
The missing pixels are interpolated as:

$$x_2' = 2x_1 - x_0$$

$$x_{-2}' = 2x_{-1} - x_0$$

Substituting these values the unscaled kernel is

| 0 | $\tfrac{3}{4} - a$ | $2a - \tfrac{1}{2}$ | $\tfrac{3}{4} - a$ | 0 |
|---|---|---|---|---|

The closest value of a to 0.4 that will give the required result is 0.375, which gives a kernel of:

| 0 | 6 | 4 | 6 | 0 |
|---|---|---|---|---|

01111

The missing pixels are interpolated as:

$$x_{-2}'=2x_{-1}-x_0$$

Substituting these values the unscaled kernel is

| 0 | $\frac{3}{4}-a$ | $\frac{3a}{2}-\frac{1}{4}$ | $\frac{1}{4}$ | $\frac{1}{4}-\frac{a}{2}$ |
|---|---|---|---|---|
|   |   |   |   |   |

The closest value of a to 0.4 that will give the required result is 0.375, which gives a kernel of:

| 0 | 6 | 5 | 4 | 1 |
|---|---|---|---|---|

10001
By symmetry the kernel is

| 8 | 0 | 0 | 0 | 8 |
|---|---|---|---|---|

10011
The missing pixels are interpolated as:

$$x_0'=\tfrac{1}{3}(2x_1+x_{-2})$$

$$x_{-1}'=\tfrac{1}{3}(x_1+2x_{-2})$$

Substituting these values the unscaled kernel is

| $\frac{5}{12}-\frac{a}{6}$ | 0 | 0 | $\frac{1}{3}+\frac{2a}{3}$ | $\frac{1}{4}-\frac{a}{2}$ |
|---|---|---|---|---|

In this case it is not possible to choose a to satisfy our constraints. So we use the following approximation for the kernel.

| 6 | 0 | 0 | 9 | 1 |
|---|---|---|---|---|

10101
The missing pixels are interpolated as:

$$x_1'=\tfrac{1}{2}(x_0+x_2)$$

$$x_{-1}'=2(x_0+x_{-2})$$

Substituting these values the unscaled kernel is

| $\frac{3}{8}-\frac{a}{2}$ | 0 | $a+\frac{1}{4}$ | 0 | $\frac{3}{8}-\frac{a}{2}$ |
|---|---|---|---|---|

The closest value of a to 0.4 that will give the required result is 0.375, which gives a kernel of:

| 3 | 0 | 10 | 0 | 3 |
|---|---|---|---|---|

10111
The missing pixel is interpolated as:

$$x_{-1}'=\tfrac{1}{2}(x_0+x_{-2})$$

Substituting these values the unscaled kernel is

| $\frac{3}{8}-\frac{a}{2}$ | 0 | $a+\frac{1}{8}$ | $\frac{1}{4}$ | $\frac{1}{4}-\frac{a}{2}$ |
|---|---|---|---|---|

The closest value of a to 0.4 that will give the required result is 0.375, which gives a kernel of:

| 3 | 0 | 8 | 4 | 1 |
|---|---|---|---|---|

11011
The missing pixel is interpolated as:

$$x_0'=\tfrac{1}{2}(x_1+x_{-1})$$

Substituting these values the unscaled kernel is

| $\frac{1}{4}-\frac{a}{2}$ | $\frac{1}{4}+\frac{a}{2}$ | 0 | $\frac{1}{4}+\frac{a}{2}$ | $\frac{1}{4}-\frac{a}{2}$ |
|---|---|---|---|---|

The closest value of a to 0.4 that will give the required result is 0.375, which gives a kernel of:

| 1 | 7 | 0 | 7 | 1 |
|---|---|---|---|---|

The invention claimed is:

1. An apparatus for combining multiple images to form a blended image, configured to:
   identify regions of overlap: (i) in a first image and in a second image, corresponding to where those first and second images will overlap each other in the blended image; and (ii) in the first image and in a third image, corresponding to where those first and third images will overlap each other in the blended image;
   identify an image quality associated with each region of overlap;
   determine a gain for each image that, when applied to the image as a whole, will minimise a sum of: (i) a difference between the image qualities associated with the regions of overlap in the first and second images; and (ii) a difference between the image qualities associated with the regions of overlap in the first and third images; and
   apply the respective gains to the first, second and third images;
   wherein the apparatus is configured to determine the gains using a least squares calculation.

2. The apparatus as claimed in claim 1, configured to:
   identify the image quality associated with each pixel in a region of overlap;
   multiply that image quality with the image quality associated with a corresponding pixel in the image with which said region overlaps; and
   sum the multiplication results generated for the pixels comprised in said region of overlap.

3. The apparatus as claimed in claim 2, wherein the sum results represent elements of a matrix and the apparatus is configured to calculate symmetric elements of said matrix only once.

4. The apparatus as claimed in claim 2, wherein the sum results represent elements of a matrix and the apparatus is configured to store symmetric elements of said matrix only once.

5. The apparatus as claimed in claim 1, configured to determine the gain for each image in dependence on a parameter that is independent of an image quality associated with any of the images.

6. The apparatus as claimed in claim 5, wherein the parameter is the same for each image, whereby the parameter exerts an overall control on the gains determined for each image.

7. The apparatus as claimed in claim 1, wherein each image is a camera image and each camera image is associated with an individual level of brightness.

8. The apparatus as claimed in claim 1, wherein the image quality is luminance.

9. A method comprising:
identifying regions of overlap: (i) in a first image and in a second image, corresponding to where those first and second images will overlap each other in the blended image; and (ii) in the first image and in a third image, corresponding to where those first and third images will overlap each other in the blended image;
identifying an image quality associated with each region of overlap;
determining a gain for each image that, when applied to the image as a whole, will minimise a sum of: (i) a difference between the image qualities associated with the regions of overlap in the first and second images; and (ii) a difference between the image qualities associated with the regions of overlap in the first and third images; and
applying the respective gains to the first, second and third images;
wherein determining a gain for each image uses a least squares calculation.

* * * * *